Figure 1:
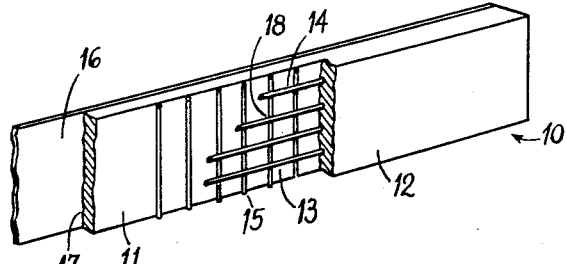

Jan. 23, 1962  A. F. WERNER ETAL  3,018,208
REINFORCED SEALING TAPE
Filed July 16, 1958  2 Sheets-Sheet 1

United States Patent Office 3,018,208
Patented Jan. 23, 1962

3,018,208
REINFORCED SEALING TAPE
Alfred F. Werner, Saddle Brook, and George Stepien, Jr., Passaic, N.J., assignors to United States Rubber Company, New York, N.Y., a corporation of New Jersey
Filed July 16, 1958, Ser. No. 748,963
7 Claims. (Cl. 154—53.5)

This invention relates to an elastomeric sealing tape especially adapted for use in window manufacture and the like, and more particularly to a fiber reinforced sealing tape of the character described having new and novel properties.

In the manufacture of glass windows having, for example, metal supporting frames, or where large windows are constructed by the joining of two or more glass panels together side by side, it is necessary in order to make the structure weather-proof and to cushion the glass from vibrations as well as for other well-known reasons that some special sort of sealing means be employed along the metal-to-glass or glass-to-glass seams.

In general it has been the practice to employ relatively soft, tacky, rubber and rubber-like materials for this purpose, and for convenience in manufacture and sale such materials have generally been made available in tape form and applied thus to the edges of the glass panels being joined. In order to prevent the tape material from stretching appreciably during use, and to increase somewhat the tensile strength thereof, bias-cut as well as square woven fabric supporting yarns have been incorporated into the tape but have not proven entirely satisfactory.

With such prior tapes one major disadvantage has been that when bending or curving the tape in a transverse direction across the width of the tape, e.g. in applying it along the curved edge or sharp corner of a glass panel, the inside edge or margin of the tape becomes wrinkled or crimped due to the woven threads being tightly locked together, thereby creating folds in the outer surface of the tape which have to be smoothed out if a weathertight leakproof seal is to be made when the taped panel is inserted or joined with the metal supporting frame. In attempting to eliminate such undesirable folds, the compressive force generally found necessary to accomplish the desired result has frequently if not always created mechanical stresses in the glass to such an extent that either fracture would occur immediately, or, which is even worse, the fabricated window would have latent weaknesses which would become evident at some later time after the window had been placed in use.

In any event such prior tapes greatly increased the cost of manufacture of such windows and resulted in a finished product which was mechanically dangerous and undependable in use.

Furthermore, in the type in which the threads or yarns are bias-cut (i.e. running diagonally across the tape) the tape can be stretched appreciably both longitudinally and laterally, and under the compressive forces encountered in the fabrication of windows it has been found that such tapes tend to flow out from the seam joints resulting in unsatisfactory structures.

Other similar materials have been known which employ reinforcing strands running in a longitudinal direction only, but their shortcomings for the present usage are obvious in view of the complete absence of transverse stability.

It is an object of the present invention to provide a reinforced sealing tape of rubber or the like, having increased dimensional stability in use both transversely as well as longitudinally, such tape containing a non-woven fibrous scrim insert, and being capable of being curved or bent transversely across the width of the tape without causing bulges or folds therein when for example it is adhered to a flat surface.

Another object is to provide such a tape containing a rectangular mesh non-woven scrim insert which permits relative shifting of the longitudinal and transverse yarns in use.

A further object is to provide a tape of the character described having increased tensile strength, greatly improved sealing properties, and a longer useful life in comparison with tapes known heretofore.

Briefly stated, the sealing tape of the present invention has a non-woven fibrous scrim sandwiched between two strips of a tacky uncured butyl rubber composition. The scrim has a rectangular mesh, and the warp or lengthwise yarns are aligned with the longitudinal axis of the tape, while the fill or sidewise yarns are aligned with the transverse axis of the tape. The yarns are lightly adhered together at their cross-over points with a weak cement such that the strength of such bond is less than the tensile strength of the yarns.

The transverse threads or yarns hold the longitudinal threads in place when the tape is curved or bent during application around the edge of a glass panel and furthermore they prevent the rubber material of the tape from running out of the window frame joint when pressure is applied during the sealing operation.

Thus a tape is provided which has dimensional stability in both directions yet permits relative shifting of the transverse and longitudinal fabric yarns if necessary and thus avoids crimping at curves and bends in the tape.

Figure 3:
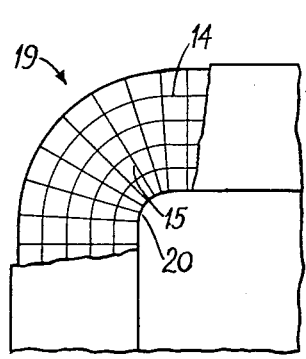
Figures 4, 5:
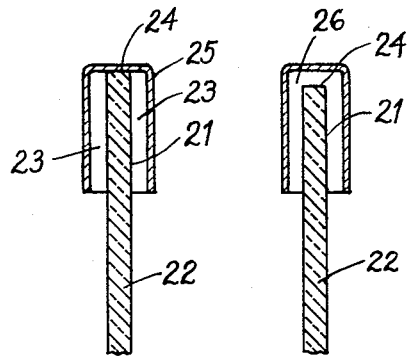
Figure 2:
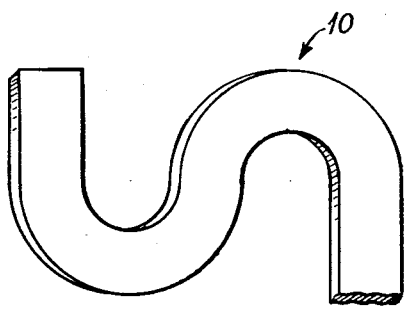
Figure 6:
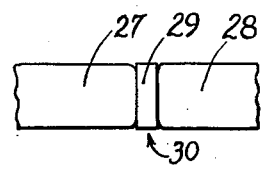
Figure 7:
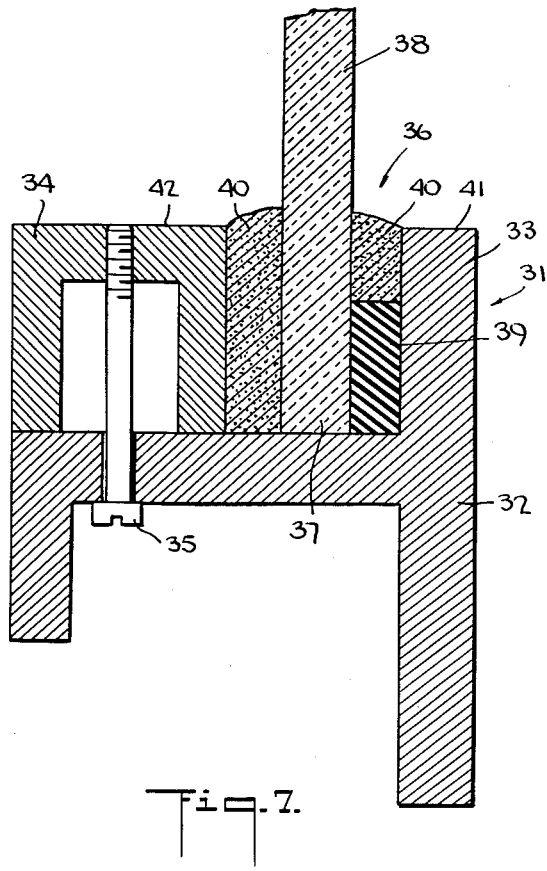

Other objects and features of the invention will become apparent in the following description and claims, and in the drawings in which:

FIG. 1 is a sectionalized isometric view of the tape;
FIG. 2 is a plan view of an S-curve length of tape;
FIG. 3 is a sectionalized plan view of a taped corner of a glass panel;
FIG. 4 is an elevation section of a window frame joint;
FIG. 5 is an elevation section of another type of window frame joint;
FIG. 6 is a fragmentary plan view of a glass panel butt joint; and
FIG. 7 is a fragmentary cross-section of an additional type of window frame joint.

Referring now to the drawings, FIG. 1 shows a tape according to the present invention designated generally by the reference numeral 10. It is comprised of first and second strips or layers 11, 12 of uncured butyl rubber having a tacky adhesive consistency. The strips are bonded together, and sandwiched between them is a fibrous scrim insert 13 having a rectangular mesh as shown and one set of lengthwise yarns or threads 14, laterally spaced relative to one another and aligned with the longitudinal axis of the tape. Another set of threads 15 run sidewise of the tape and are aligned with the transverse axis of the tape as shown. The tape in its preferred form has both sets of threads extending from end to end and side to side, respectively, of the tape. A removable separator strip 16 of polyethylene or the like is adhered to one side 17 of the tape 10 to permit rolling the tape up on itself until used.

The strips or layers 11, 12 can be made of a number of other materials in addition to the butyl rubber, such as neoprene, natural rubber, or plastic materials, i.e. any of the various elastomeric or rubber materials having the desired tackiness and adhesive properties.

Butyl rubber has been found to be an excellent material because it gives outstanding sunlight and ozone resistance to the tape, which properties are very important in material used to form a seal between window glass and a metal supporting frame. The butyl rubber is a vulcanizable copolymer of a major proportion, typically 90 to 99.5% of isobutylene and a minor proportion, typically from 10 to 0.5% of an aliphatic conjugated diolefin, particularly butadiene or isoprene. The composition is not cured in order to retain the adhesive and pliant properties desired.

The scrim 13 is a non-woven web or fabric network in which the longitudinal yarns 14 are laid over the transverse yarns 15 and the yarns are adhered together at the crossover points 18 with an adhesive or cement (not shown) e.g. polyvinyl acetate, which provides a relatively weak adhesive bond between the two sets of yarns, so that the bond will break before the yarns will break, i.e. the bond is weaker than the tensile strength of the yarns, and preferably is considerably weaker, being for example of the order of between about .05 to 0.10 ounce.

FIG. 3 shows a typical rounded corner portion of a window frame 19 having the sealing tape 10 curved as shown. The cutaway portion shows how the longitudinal threads 14 adjust themselves relative to the transverse threads 15 at the curve with the consequent avoidance of crimping at the inner edge 20 of the tape. The weak bond is an important feature of the fabric insert or scrim 13, so that the yarns may adjust themselves relatively freely with respect to one another, especially the longitudinal yarns 14 in relation to the transverse yarns 15, by breaking the bond when the tape is bent into curves or at right angles such as shown in FIG. 2 when in use.

The scrim insert 13 prevents the tape from flowing and stretching both transversely and longitudinally under the compressive forces encountered when it is applied as a seal in, for example, a window frame, but permits the tape to be bent to sharp angles without crimping or wrinkling on the inside of the curve which is highly undesirable as previously mentioned.

The yarns may be made of various natural or synthetic fibers, such as nylon, rayon, cotton and the like, and exceptionally good results have been achieved with the use of nylon yarns 14 in the warp or longitudinal direction and rayon yarns 15 in the fill or transverse direction of the tape.

In use, the tape is applied to the edge portion 21 of the glass window pane 22 (see FIGS. 4 and 5), and may be applied in various ways. One method is shown in FIG. 4, wherein the tape material 23 is placed on either side of the pane, but not around the side edge 24 and then the taped edge portion 21 is inserted into the metal frame 25. FIG. 5 shows another method in which a wider tape 26 is used which covers the entire edge portion 21 on both sides of the pane 22.

The tape also finds use in curtain wall window construction for sealing adjoining glass panels 27, 28 by interposing the tape material 29 along the butt seam 30 as shown in FIG. 6.

The tape may also be used in conjunction with any of the known sealing compounds in a manner as shown for example in FIG. 7. The window frame 31 has a main section 32 with a fixed, upstanding edge portion 33 and an adjacent molding strip 34 affixable to the main section by any convenient means such as a screw 35 to provide a groove or channel 36 along the frame for receiving the edge portion 37 of the glass panel 38. The sealing tape 39 is placed along one side of the panel edge as shown (although it may be placed against the other side or both sides if so desired) and then sealing compound 40 is used to fill in the remaining voids of the channel up to the upper edges 41, 42 of the frame to provide a strong durable weathertight seal.

The method of manufacturing the reinforced tape of the invention is as follows:

First the butyl rubber or other elastomer is calendered or rolled into a sheet or strip of the desired thickness and then the non-woven fibrous scrim is placed on one side of the butyl strip, so that the longitudinal yarns and transverse yarns of the scrim are aligned with the respective axes of the strip and then the strip and scrim are calendered. Next a second sheet of the rubber is formed and calendered against the scrim-containing side of the first strip, thereby sandwiching the scrim between the two calendered sheets and bonding the rubber sheets together.

The tape is usually manufactured in sheets and then cut into strips to form the tape. A thin polyethylene sheet having, for example, a thickness of about .005 inch, is used as a separator and applied to one side of the tape during manufacture so that the tape can be rolled up upon itself until used. After or just before the tape is applied to the periphery of the glass pane the polyethylene strip is then removed. The method of production described above can be varied in certain respects as desired. The polyethylene can be laid down first and then the rest of the tape built upon it, or the polyethylene can be applied after the other layers have been formed. In addition, the various layers can be calendered step by step as previously outlined, or the calendering of intermediate portions may be dispensed with and a final calendering compression given to the complete sandwich of materials.

Although one embodiment of the invention has been shown and described herein, it is to be understood that certain changes and additions can be made by those skilled in the art without departing from the scope and spirit of the invention.

Having thus described our invention, what we claim and desire to protect by Letters Patent is:

1. A reinforced sealing tape comprising a non-woven fibrous scrim sandwiched between bonded layers of tacky electomeric material having adhesive properties, said scrim having a first set of laterally spaced yarns aligned with the longitudinal axis of said tape, a second set of axially spaced yarns aligned with the transverse axis of said tape, said yarns being adhered together at their crossover points with a bond which is substantially weaker than the tensile strength of said yarns, thus to permit said bond to break and said yarns to readjust themselves when said tape is bent in its plane.

2. A reinforced sealing tape comprising a non-woven synthetic fibrous scrim sandwiched between bonded layers of tacky elastomeric material having adhesive properties, said scrim having a first set of laterally spaced yarns extending the length of said tape and aligned with the longitudinal axis of said tape, a second set of axially spaced yarns extending from side to side of said tape and aligned with the transverse axis of said tape, said yarns being adhered together at their crossover points with a bond which is substantially weaker than the tensile strength of said yarns, thus to permit said bond to break and said yarns to readjust themselves when said tape is bent in its plane.

3. A reinforced sealing tape comprising a non-woven fibrous scrim composed of yarns selected from the group consisting of nylon, rayon and cotton sandwiched between bonded layers of an adhesive elastomeric material selected from the group consisting of butyl rubber, natural rubber and neoprene, said scrim having a first set of laterally spaced yarns aligned with the longitudinal axis of said tape, a second set of axially spaced yarns aligned with the transverse axis of said tape, said yarns being adhered together at their crossover points with a bond which is substantially weaker than the tensile strength of said yarns.

4. A reinforced sealing tape comprising a non-woven fibrous scrim composed of yarns selected from the group consisting of nylon, rayon and cotton sandwiched between bonded layers of an adhesive elastomeric material selected from the group consisting of butyl rubber, natural rubber and neoprene, said scrim having a first set of laterally spaced yarns extending the length of said tape and aligned with the longitudinal axis of said tape, a second set of axially spaced yarns extending from side to side of said tape and aligned with the transverse axis of said tape, said yarns being adhered together at their crossover points with a polyvinyl acetate cement bond which is substantially weaker than the tensile strength of said yarns whereby dimensional stability is provided for said tape and crimping is avoided when said tape is bent at sharp angles.

5. A reinforced sealing tape for glass windows comprising a non-woven fibrous scrim sandwiched between bonded layers of uncured butyl rubber, said scrim having a group of nylon yarns aligned with the longitudinal axis of said tape, and another group of rayon yarns aligned with the transverse axis of said tape, said yarns being adhered together at their crossover points with a bond which is substantially weaker than the tensile strength of said yarns.

6. A reinforced sealing tape for glass windows comprising a non-woven fibrous scrim having a rectangular mesh and being sandwiched between bonded layers of uncured butyl rubber, said scrim having a group of laterally spaced nylon yarns extending the length of said tape and aligned with the longitudinal axis thereof, and another group of axially spaced rayon yarns extending from side to side of said tape and aligned with the transverse axis thereof, said yarns being adhered together at their crossover points with a polyvinyl acetate cement bond which is substantially weaker than the tensile strength of said yarns.

7. A reinforced sealing tape for glass windows comprising a non-woven fibrous scrim having a rectangular mesh and being sandwiched between bonded layers of uncured butyl rubber, said scrim having a group of laterally spaced nylon yarns extending the length of said tape and aligned with the longitudinal axis thereof, and another group of axially spaced rayon yarns extending from side to side of said tape and aligned with the transverse axis thereof, said yarns being adhered together at their crossover points with a polyvinyl acetate cement bond which is substantially weaker than the tensile strength of said yarns, and a removable polyethylene separator layer on one surface of said tape, whereby said tape can be rolled upon itself until used.

References Cited in the file of this patent
UNITED STATES PATENTS

| | | |
|---|---|---|
| 1,660,924 | Hopkinson | Feb. 28, 1928 |
| 1,811,925 | Garrett | Jan. 30, 1931 |
| 2,135,057 | Slayter et al. | Nov. 1, 1938 |
| 2,377,650 | Reimel | June 5, 1945 |
| 2,541,498 | Calvert | Feb. 13, 1951 |
| 2,674,555 | Pahl et al. | Apr. 6, 1954 |
| 2,713,551 | Kennedy | June 19, 1955 |
| 2,750,314 | Bemmels | June 12, 1956 |
| 2,786,789 | Carlson | Mar. 26, 1957 |
| 2,787,570 | Lott et al. | Apr. 2, 1957 |
| 2,851,389 | Lappala | Sept. 9, 1958 |